(12) United States Patent
Chainer et al.

(10) Patent No.: US 11,074,831 B2
(45) Date of Patent: Jul. 27, 2021

(54) PERSONAL FOOD DATABASE

(71) Applicant: INTERNATIONAL BUSINESS MACHINES CORPORATION, Armonk, NY (US)

(72) Inventors: Timothy J. Chainer, Putnam Valley, NY (US); Gerard McVicker, Stormville, NY (US); Pritish R. Parida, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 15/247,892

(22) Filed: Aug. 25, 2016

(65) Prior Publication Data

US 2018/0061270 A1     Mar. 1, 2018

(51) Int. Cl.
*G09B 19/00*     (2006.01)
*G06Q 10/08*     (2012.01)

(52) U.S. Cl.
CPC ....... *G09B 19/0092* (2013.01); *G06Q 10/087* (2013.01)

(58) Field of Classification Search
CPC .......... G06F 17/30345; G09B 19/0092; G06Q 10/087
See application file for complete search history.

(56) References Cited

U.S. PATENT DOCUMENTS

| | | | |
|---|---|---|---|
| 6,865,261 B1 * | 3/2005 | Rao ................. | G06F 3/023 379/90.01 |
| 7,065,501 B1 * | 6/2006 | Brown ............... | G06Q 10/087 705/22 |
| 8,249,956 B1 * | 8/2012 | Barua ............... | G06Q 10/08 705/28 |
| 9,153,089 B1 * | 10/2015 | Hewett .............. | G06Q 20/322 |
| 10,438,276 B2 * | 10/2019 | Godsey .............. | G06Q 10/087 |
| 2004/0078272 A1 * | 4/2004 | Brown ............... | G06Q 10/087 705/22 |
| 2007/0032240 A1 | 2/2007 | Finnegan et al. | |
| 2007/0124216 A1 * | 5/2007 | Lucas ............... | G06Q 30/02 705/26.1 |
| 2008/0032719 A1 | 2/2008 | Rosenberg | |
| 2010/0023383 A1 | 1/2010 | Aaltonen et al. | |
| 2011/0212751 A1 | 9/2011 | Havens et al. | |
| 2012/0077472 A1 | 3/2012 | Timmins et al. | |
| 2012/0190386 A1 | 7/2012 | Anderson | |
| 2013/0052616 A1 * | 2/2013 | Silverstein ......... | G09B 19/0092 434/127 |
| 2013/0083003 A1 * | 4/2013 | Perez ................ | G06F 3/005 345/419 |
| 2013/0175337 A1 * | 7/2013 | Briancon ........... | G06F 17/30002 235/375 |
| 2013/0290172 A1 * | 10/2013 | Mashinsky .......... | G06Q 20/384 705/39 |

(Continued)

*Primary Examiner* — Malina D. Blaise
(74) *Attorney, Agent, or Firm* — Intelletek Law Group, PLLC; Gabriel Daniel, Esq.

(57) ABSTRACT

A Personal Food Database (PFD) that resides on a consumer's mobile device is presented. The PFD maintains an inventory that keeps track of amount of available food items. The mobile device operating the PFD has sensors for measuring the activities or biometric data of the user. The PFD uses the sensor data to assess the nutrition need of the user and to recommend recipes accordingly.

20 Claims, 8 Drawing Sheets

(56) References Cited

U.S. PATENT DOCUMENTS

| | | | | |
|---|---|---|---|---|
| 2014/0006131 A1* | 1/2014 | Causey | ............... | G06Q 10/0875 705/14.24 |
| 2014/0067617 A1* | 3/2014 | Heine | ................ | G06Q 10/0875 705/26.81 |
| 2014/0095479 A1* | 4/2014 | Chang | ............... | G06F 17/30699 707/722 |
| 2014/0201001 A1* | 7/2014 | Rellas | ................ | G06Q 30/0261 705/14.58 |
| 2014/0324627 A1* | 10/2014 | Haver | ................ | G06Q 30/0639 705/26.9 |
| 2015/0206413 A1* | 7/2015 | Warner | ................. | G06Q 50/22 340/573.1 |
| 2015/0221013 A1* | 8/2015 | Rinicella | ................ | H04W 4/80 705/26.61 |
| 2015/0269656 A1* | 9/2015 | Tamm | ................ | G06Q 10/087 705/26.9 |
| 2015/0312348 A1* | 10/2015 | Lustgarten | .............. | H04L 67/12 705/14.66 |
| 2016/0055503 A1* | 2/2016 | Chan | ................... | G06Q 30/0261 705/7.34 |
| 2016/0058367 A1* | 3/2016 | Raghuram | ............. | A61B 5/486 600/479 |
| 2016/0071050 A1* | 3/2016 | Kaye | ................. | G06Q 30/0623 705/15 |
| 2016/0140646 A1* | 5/2016 | Humphreys | ....... | G06Q 30/0633 705/26.8 |
| 2016/0188648 A1* | 6/2016 | Malcolm | .......... | G06F 17/30342 707/746 |
| 2016/0350704 A1* | 12/2016 | Minvielle | ............ | G06Q 10/087 |
| 2016/0350715 A1* | 12/2016 | Minvielle | .......... | G06Q 10/0875 |
| 2016/0371631 A1* | 12/2016 | Jetcheva | ............ | G06Q 10/087 |
| 2017/0039511 A1* | 2/2017 | Corona | ................... | F25D 29/00 |
| 2017/0116661 A1* | 4/2017 | Sundaram | ............... | H04L 67/12 |
| 2017/0140330 A1* | 5/2017 | Rinzler | ................ | H02J 7/0042 |
| 2017/0293984 A1* | 10/2017 | Goldberg | ................ | G06Q 50/12 |
| 2017/0372240 A1* | 12/2017 | Bender | ............ | G06Q 10/0633 |
| 2018/0053140 A1* | 2/2018 | Baca | ..................... | G01N 33/02 |

\* cited by examiner

PERSONAL FOOD DATABASE

BACKGROUND

Technical Field

The present application generally relates to maintenance of an inventory, specifically by a mobile computing device.

Description of the Related Art

A modern mobile device such as a smart phone is a highly personal device. It is frequently used to store and organize personal information of its user. Such a mobile device is usually equipped with computation, communications, global positioning, and even biometric-sensing capabilities. These various capabilities enable the mobile device to produce highly personalized content for its user.

SUMMARY

A mobile device that maintains a personalized database is presented. In some embodiments, the mobile device includes a processor, a data input device, a global positioning device, a display, and a memory that stores a software. The execution of the software by the processor configures the processor to (i) updates an inventory based on data received through the data input device, (ii) identifies a type of items based on the inventory, (iii) identifies a supplier of the identified type of items based on a position and of the mobile device provided by the global positioning device, and (vi) presents information regarding the identified supplier at the display.

In some embodiments, the mobile device includes a processor, a data input device, a set of sensors, a display, a storage, and a memory. The storage is configured to store a plurality of recipes, a history of consumption, a set of biometric data, and a inventory of foods. The memory stores a software, the execution of which by the processor configures the processor to (i) updating the set of biometric data based on a set of sensor data provided by the set of sensors, (ii) updating an inventory based on data received through the data input device, (iii) selecting a recipe from the plurality of recipes based on the history of consumption, the inventory of foods, and the set of biometric data, and (iv) presenting the selected recipe at the display.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is provided. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

Figure 1:
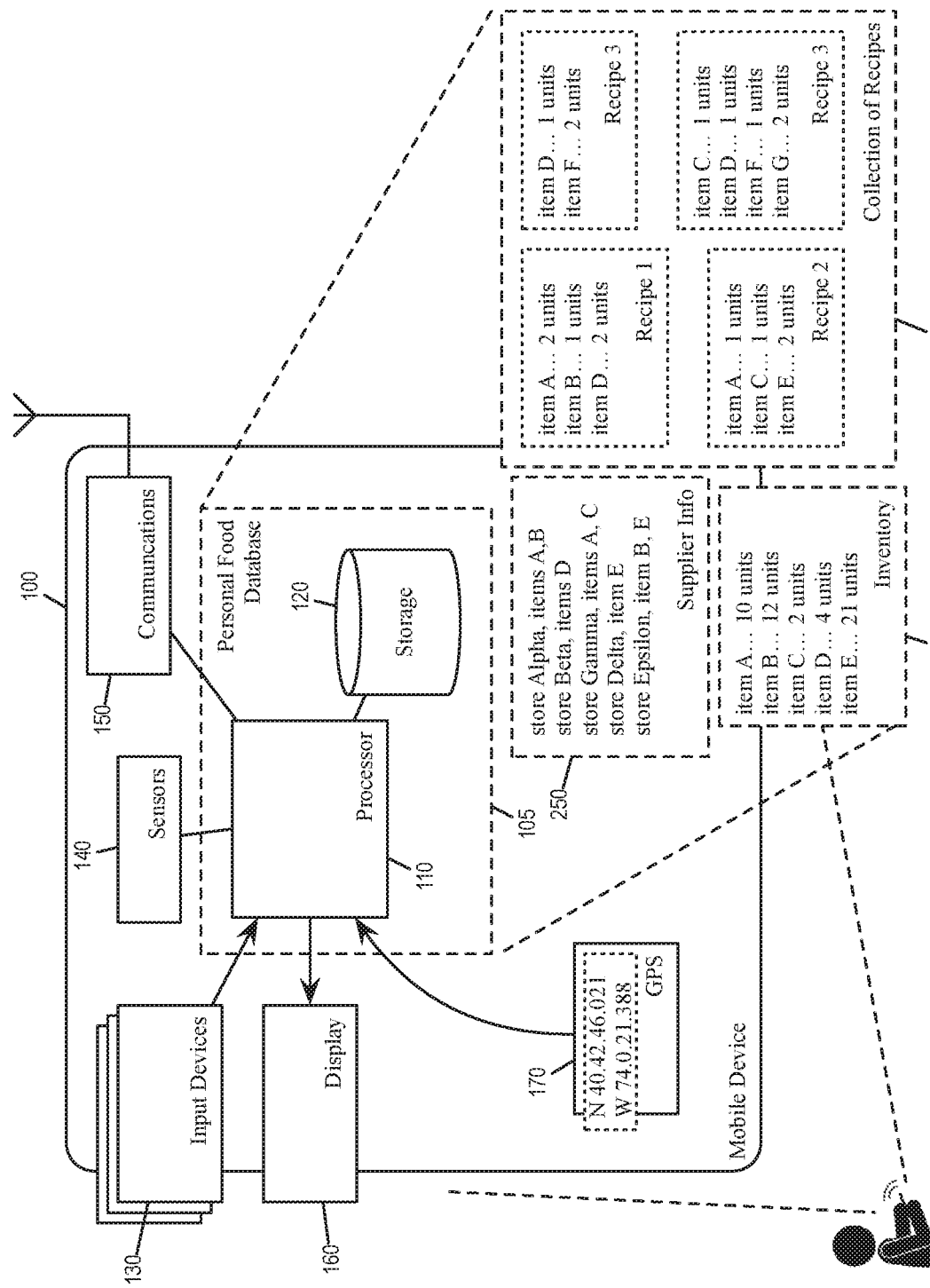
FIG. 1 illustrates a mobile device that implements a personal food database (PFD) for its user.

Some embodiments of the disclosure provide a Personal Food Database (PFD) that resides on a consumer's mobile device. The mobile device compares the needed ingredients for a chosen recipe against the quantities shown as available on the consumer's Personal Food Database.

In some embodiments, when checking out an item at a store, the item is scanned and information regarding the scanned item is downloaded into the mobile device and transferred to the PFD resident on the mobile device. The information transferred to the PFD may include the price and date of purchase. Some embodiments provide additional product information to the PFD, such as nutritional information from a resident library in the PFD that is indexed to the UPC. In one embodiment, the PFD receives additional information such as product origin, product size, weight, or other information that that can be provided by the manufacturer through the products UPC code.

In some embodiments, the PFD maintains an inventory that keeps track of an amount of available food items by monitoring purchases and consumptions. The PFD updates the inventory when the consumer records the purchase of a food item (by e.g., scanning the item's UPC code). In one embodiment, the user input selection of recipes for consumption into the PFD, and the PFD subtracts the amount used for each individual recipe from the PFD's inventory. When a recipe is selected for preparation and consumption, the PFD checks for availability of the required ingredients with the amounts and expiration dates recorded in the PFD's inventory. The PFD in turn informs the consumer of the required ingredients that are likely not available at home based on the PFD's inventory.

Some embodiments calculate nutritional, caloric, sugar, salt and other health content of the prior recipes from a history consumption maintained by the PFD. Some embodiments select a recipe by examining the history of consumption and a health profile (stored in the PFD) of the consumer, which include the consumer's height, weight and other medical condition. The mobile device implementing the PFD may communicate with online data sources to receive alerts of product recalls and special offers. In some embodiments, PFD notifies the consumer of specials offered at different stores when the consumer selects a recipe. In some embodiments, the PFD notifies the consumer of the specials offered at a particular store when the consumer has selected that store to shop. In some embodiments, the PFD notifies the consumer of the specials available for the ingredients needed to prepare a particular recipe. The PFD in some embodiments maintains a health profile or allergy alert for the consumer to help guide the consumer when selecting a recipe for consumption. In some embodiments, the PFD allows the consumer to enter food allergies of family members and guests for the purpose of selecting a recipe.

In some embodiments, the PFD monitors the dietary habits and social behavior of the user and provides suggestions, such as donation and sharing regarding food items nearing their expiration date, to minimize food wastage.

FIG. 1 illustrates an example computing device in the form of a mobile device 100 that may be used to implement a personal food database (PFD) for its user. In some embodiments, the PFD is a personal database that utilizes the functionalities of the mobile device to provide its user personalized information and recommendations for his/her nutrition consumption, personal health, purchases, inventory management, etc.

In some embodiments, the mobile device 100 is a computing device that can be carried or worn by a person. Such a mobile device can be a smart phone, a personal digital assistant (PDA), a tablet computer, a personal fitness monitor, a smart watch (such as Apple Watch®), a personal activity tracker, or other lightweight or easy-to-carry personal computing device. In some embodiments, the PFD is implemented on larger computing devices such as laptop or desktop computers.

The example computing device 100 includes a processor 110, a storage 120, a set of input devices 130, a set of sensors, 140, a wireless communications module 150, a display 160, a global positioning system (GPS) 170. As illustrated, the processor 110 (which can be a set of processors) and the storage 120 implement a PFD 105, where the processor 110 manages and updates the PFD database stored in the storage 120. The processor 110 in some embodiments executes one or more programs in order to operate the PFD database. The processor 110 manages the database based on input from the set of input devices 130, the set of sensors 140, the wireless communications module 150, and the global positioning system (GPS) 170.

The set of input devices 130 in some embodiments include a user interface device, such as the touch screen of the mobile device that allows the user to interact with graphical user interface elements to directly enter user data or user selections. In some embodiments, the set of input devices also includes an optical input device, such as a scanner or a camera that is capable of capturing images (e.g., bar codes, scan pattern, etc.,) and producing data for the PFD based on the captured images.

The sensors 140 in some embodiments include sensors that can be used to monitor the activities and/or biometrics of the user/wearer of the mobile device 100. In some embodiments, such sensors can include one or more of the following: a motion sensor, a heart or pulse rate monitor, body temperature monitor, blood pressure monitor, and other types of biometric monitors.

The communications module 150 allows the mobile device 100 to communicate with other computing devices, directly or through a network. In some embodiments, the communications module 150 is a wireless communications module that allows the example computing device 100 to send and receive data while moving from one place to another. In one embodiments, the communications module communicates through a wireless communications protocol such as WiFi or Bluetooth protocols. The communications module 150 may also include capabilities for wired communications, or other types of communications capabilities, such as infrared.

The GPS module 170 is for providing a current position of the mobile device. This allows the PFD to perform operations and provide information based on the current location of its user, such as identifying neighboring stores.

In some embodiments, the PFD is a database that stores a variety of data that are derived based on the inputs of the mobile device. The PFD manages and updates these different types of data to produce food-related personalized information for presentation to the user through the display 160 of the mobile device 110.

Figure 2:
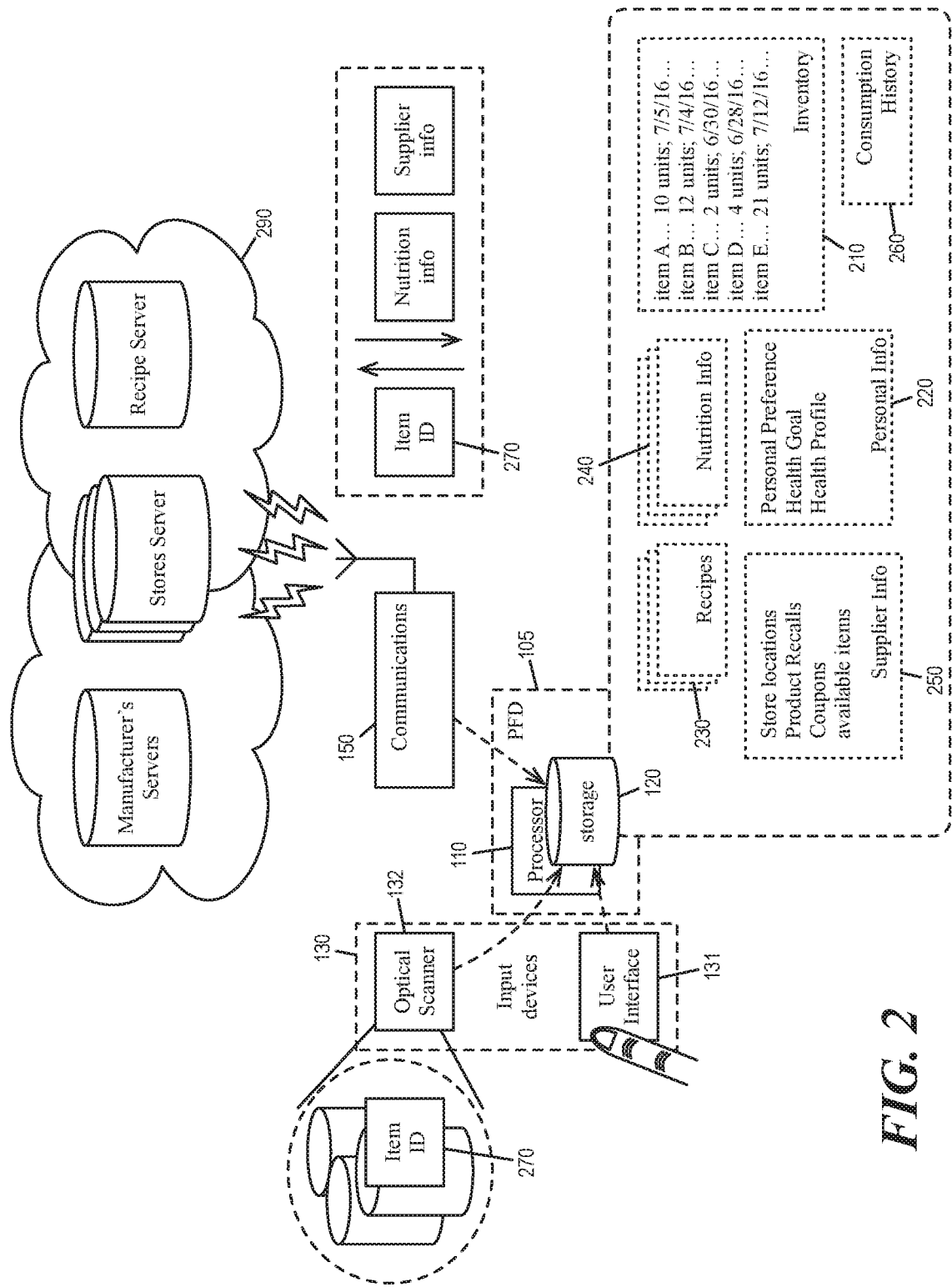
FIG. 2 illustrates the content of the PFD database for some embodiments as well as various inputs to the PFD that serve as the basis of the PFD content.

FIG. 2 illustrates the content of the PFD database for some embodiments as well as various inputs to the PFD that serve as the basis of the PFD database content.

The PFD includes an inventory 210, which is a list of items available to the user to consume. As this is a food database, the inventory is a list of food items or other ingredients for making food or meals. In some embodiments, each food item is associated with its purchase date and/or expiration date. In some embodiments, the food items are organized according to types (e.g., eggs, milk, tomato, fish, salt, sugar, etc.,) and the PFD maintains a count of each type of food item. In the example illustrated, the inventory 210 indicates that there are 10 units of the food item "A," and at least one of the units has the expiration date of Jul. 5, 2016. As food items are consumed or purchased, the PFD updates the inventory 210 to reflect the changes.

The PFD stores a collection of recipes 230. Each recipe includes a list of items or ingredients that are used to make an entrée. In some embodiments, the PFD reduces the count of items in the inventory 210 according to a particular recipe when the user notifies the PFD that the particular recipe has been used to prepare an entrée, and the preparation uses as ingredients items recorded by the PFD.

The PFD also stores personal information 220 about the user, such as the user's health profile, health goal, and food preferences. The PFD in some embodiments uses the information as basis to recommend a recipe or to recommend against a recipe. For example, the health profile of a user in some embodiments records any medical condition (allergy, disease, etc.) that the user may have and issue warnings against recipes based on those medical conditions, such as recipes containing ingredients that would cause allergic reaction identified by the personal information 220. In some embodiments, the PFD can store personal information of more than one person so that the PFD can issue warnings based on health profiles of multiple different consumers.

The PFD stores nutritional information 240 for the food items recorded in the inventory 210. In some embodiments, the example computing device obtains the information from the manufacturers of the food items, which details nutritional information such as calorie count, vitamin and mineral contents, etc. The PFD may presents the nutritional content of a recipe to the user when the recipe is selected.

The PFD also includes a consumption history 260, which records the food items and/or recipes that were prepared and consumed over a period of time (e.g., a week). Some embodiments recommend a recipe based on the consumption history 260, the nutrition information of the food that has been consumed (based on nutrition info 240), and the personal information 220.

The PFD further includes supplier information 250. A supplier is a source from which items specified in the PFD can be obtained for preparing a recipe or to replenish the inventory of the PFD. The supplier of the supplier information 250 can be a physical store with a physical location, or a virtual store (i.e., a shopping website). The supplier can also be a manufacturer that directly provides goods to consumers. The information of a supplier may include store locations (physical and/or virtual), items available for sale, product recall information, special offers, pricing for items, etc. The supplier information 250 may be used to identify a most preferred supplier for a particular item or a particular set of items. For example, some embodiments use the supplier information 250 to identify the supplier with the lowest price, and some embodiments use the supplier information to identify the supplier from which the particular items can be most conveniently obtained (e.g., requiring the least amount of time).

As mentioned, in some embodiments, the data of the PFD 105 is stored in the storage 120 while the processor 110 manages and updates the data in the PFD database based on the inputs from various sources. FIG. 2 illustrates the sources for some of these data in some embodiments. As illustrated the input devices 130 includes an optical scanner 132 and a user interface 131.

The optical scanner 132 captures images of items purchased and obtains the identities 270 of the goods purchase based on the captured images. The identities of the goods obtained are then entered into the PFD and recorded in the inventory 210. Some embodiments also use the identities 270 of the one or more goods purchased to obtain related information from various external servers via the communications module 150. The obtained information in some embodiments includes nutritional information and supplier information (to be stored in the storage 120 as part of nutrition information 240 and supplier information 250). The external servers providing the information can be of the manufacturer of the items or of the stores that carry the items.

The user interface 131 allows the user to directly enter data into the PFD, such as the content of the user's personal information 220. The user interface may be used to enter recipes, or to instruct the PFD to download recipes from an external source (e.g., a recipe server, which can be a website). The user may also use the user interface to instruct the PFD to download other information, such as supplier information and nutrition information. The user interface 131 in some embodiments also allows the user to enter identities of goods purchased into the inventory 210, in conjunction or instead of using the optical scanner 132.

Figure 3A:
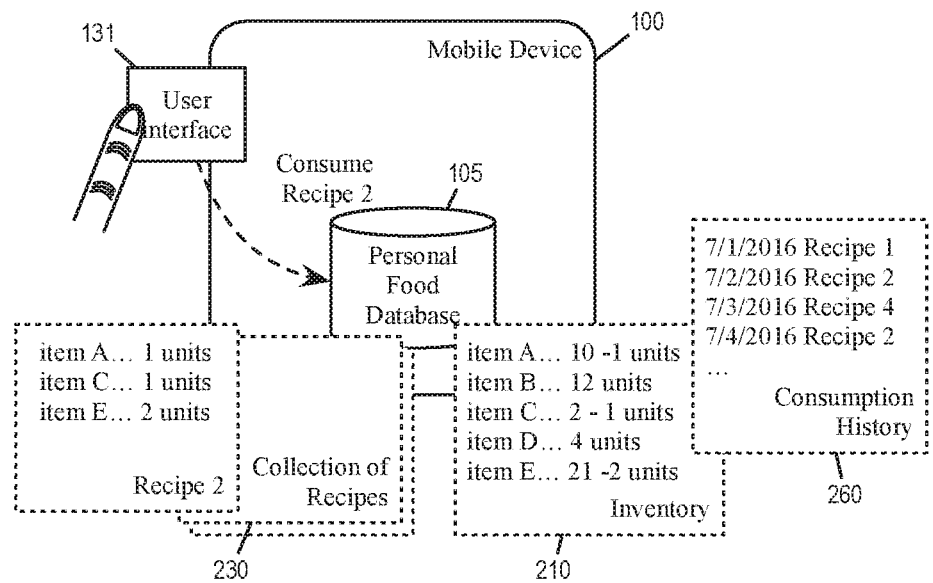
FIGS. 3a-b illustrate examples of managing the inventory of the PFD.
Figure 3B:
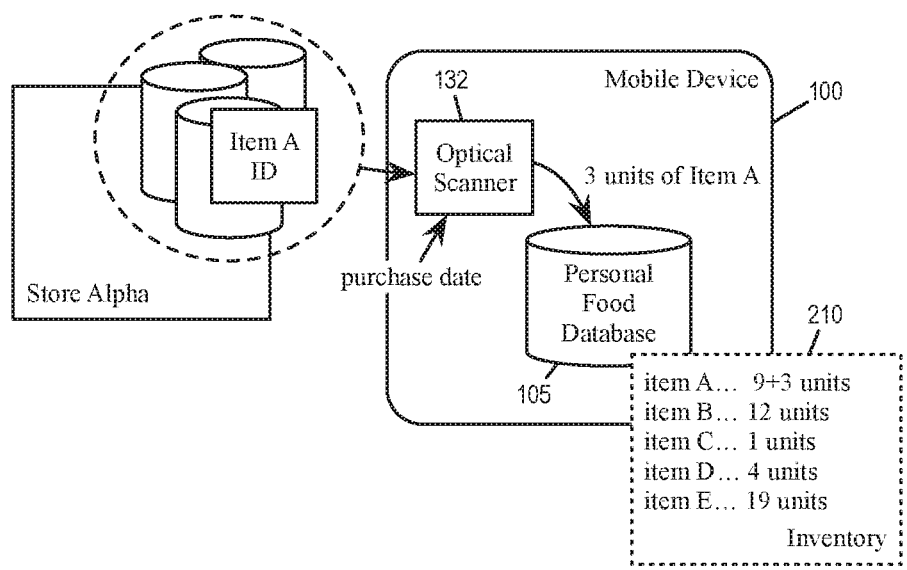

The inventory 210 of the PFD 105 is for keeping track of available items for consumption. In some embodiments, the PFD increment counts of items in the inventory when it receives notification of items acquired or purchased, while reducing counts of items in the inventory when it receives notification of items consumed. FIGS. 3a-b illustrate examples of managing the inventory of the PFD. In particular, FIG. 3a illustrates the reduction of counts of items in the inventory due to a user selecting a recipe for consumption. As illustrated, the user interface 131 is used to select "recipe2" for consumption, out of the collection of recipes 230 stored by the PFD. The recipe "recipe2" uses as ingredients 1 unit of item A, 1 unit of item C, and 2 units of item E. Correspondingly, the PFD reduces the count of item A by 1, item C by 1, and item E by 2. The PFD also updates the consumption history 260 to record that "recipe2" is consumed at this date.

In some embodiments, the PFD monitors the dietary habits and social behavior of the user and provides suggestions such as donation and sharing regarding food items nearing their expiration date in order to minimize food wastage. The PFD in some embodiments monitors the expiration dates recorded in the inventory 210 in conjunction with consumption history 260 and personal information 220 in order to identify items to donate or share.

FIG. 3b illustrates the increment of counts of items in the inventory due to purchase or acquisition of items. As illustrated, the user of the mobile device 100 uses the optical scanner 132 to capture the identities and quantities of the items purchased at a store "Alpha." The PFD enters the captured identities and quantities into the inventory 210. As illustrated, the optical scanner captured the images of three units of item A (i.e., their bar code or scan pattern) and reports the same to the PFD. The PFD in turn add 3 units of item A into the inventory 210. Though not illustrated, the PFD also time stamps the purchase with the purchase date, records its expiration date, and downloads nutritional information regarding the purchased units of item A from the store "Alpha" or from item A's manufacturer. In some embodiments, the captured bar code or scan pattern also includes other information about the purchased item, such as product origin, product size, and weight. The PFD stores this other information in its database as well.

Figure 4:
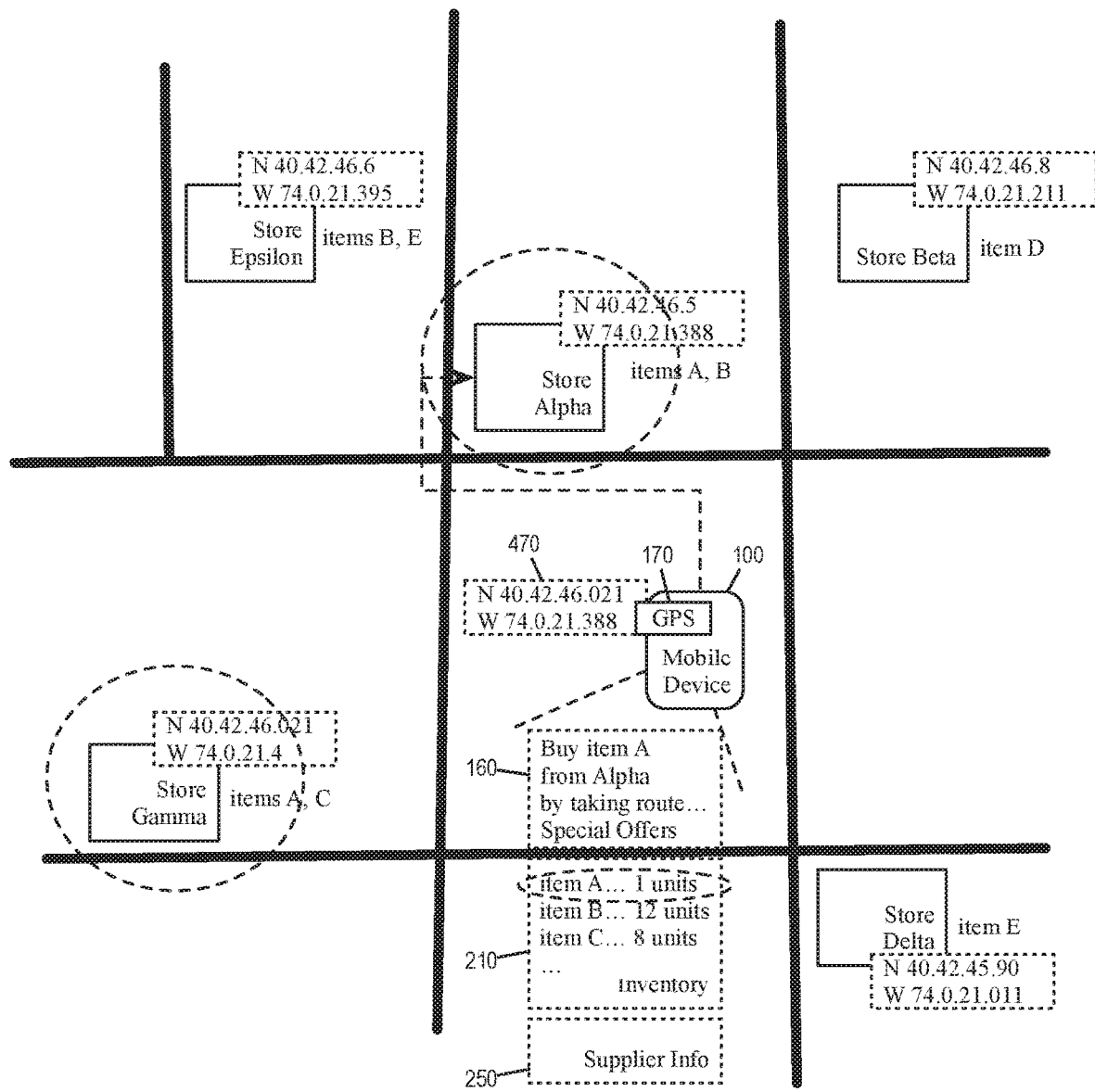
FIG. 4 illustrates the PFD using the navigation and GPS capabilities of the mobile device to select a supplier of an item identified by the PFD as requiring replenishment.

As mentioned, some embodiments implement the PFD in a mobile device. This allows the PFD to utilize the capabilities of the mobile device when providing information to the user/consumer. For example, in some embodiments, the PFD uses the GPS capability and the navigation capability of the PFD when identifying a supplier for items. Specifically, the PFD in some embodiments uses the current position of the mobile device provided by the GPS to identify the most suitable supplier (since the current position of the mobile device is presumably the current position of its user). FIG. 4 illustrates the PFD using the navigation and GPS capabilities of the mobile device to select a supplier of an item identified by the PFD as requiring replenishment.

As illustrated, the inventory 210 of the PFD indicates that item A has only 1 unit left and therefore needs replenishing. Based on the supplier info 250 stored at the mobile device 100, the PFD identifies several stores from which item A can be purchased: store "Alpha" and store "Gamma". The locations of these stores are also available in the stored supplier info 250 as GPS coordinates or addresses. The mobile device 100 operating the PFD is equipped with the GPS device 170, which produces GPS data 470 to indicate the current position of the mobile device 170. Based on the location of the stores "Alpha" and "Gamma" relative to the current position 470 of the mobile device, the mobile device identifies store "Alpha" as being a closer store to acquire item A. The mobile device 100 presents the recommendation on its display 160. In some embodiments, the mobile device 100 also includes other information about the recommended store, such as a recommended route for reaching the store, as well as special offers available at the recommended store. The mobile device in some of these embodiments computes the route locally or by using a mapping service in the Internet through its communications capabilities.

In some embodiments, the PFD considers other factors for selecting a supplier, such as the price of the item at different stores and traffic condition for reaching the different stores. The PFD in some embodiments considers both virtual suppliers and physical suppliers, and recommends a virtual supplier if the delivery time is acceptable to the user, and/or if the time it takes to reach the physical supplier is too long. In some embodiments, the PFD uses the most up to date information obtained through the communications module 150 to select a supplier.

In some embodiments, the PFD utilizes other capabilities of the mobile device to manage its database and to provide information to the user. As mentioned, the mobile device operating the PFD in some embodiments has sensors for measuring the activities or biometric data of the user. The PFD in some embodiments uses the mobile-device-provided sensor data to assess the nutrition need of the user and to recommend recipes to its user accordingly.

Figure 5:
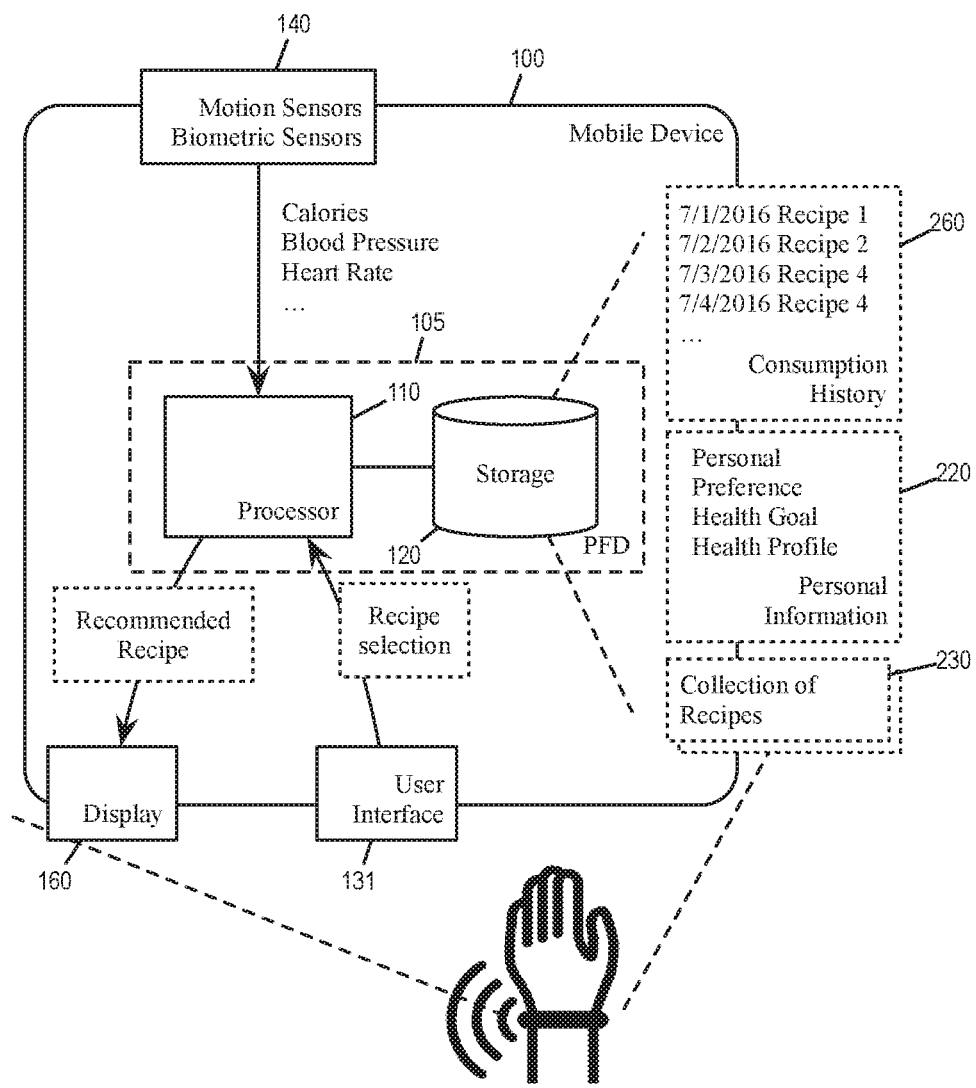
FIG. 5 illustrates a PFD that uses sensor data produced by the mobile device to present food-related recommendation to the user.

FIG. 5 illustrates a PFD that uses sensor data produced by the mobile device to present food-related recommendation to the user. In some embodiments, the PFD uses its stored history of consumption and heath profile to calculate the nutrition need of the user. The PFD then selects a recipe in the collection of recipes that have nutrition content that would satisfy the identified nutritional need of the user.

As illustrated, the motion sensors 140 provide one or more biometric readings of the mobile device's user or wearer. These data can include the amount of motion that the mobile device experienced, the heart rate/pulse rate sensed by a pulse sensor, or the readings of a body temperature sensor. The sensors 140 in some embodiments provide these sensor data in their raw form and let the PFD convert them into actual biometric of the user such as calories burned or blood pressure.

As mentioned, the PFD database stores the consumption history 260, which records the recipes that were consumed over a recent period of time. The consumption history 260 allows the PFD to determine the amount of caloric intake of the consumer/user over the recent period. The consumption history 260 also allows the PFD to keep track the amount of various types of minerals consumed by the consumer or user. In some embodiments, the PFD makes these determinations based on the nutrition information of each ingredient in the consumed recipes. The PFD also stores the personal information 220, which in some embodiments can include data to indicate to PFD how many calories and how much minerals of various types the user should have or should not have in a given period of time.

With the computed biometric data from the sensors, the total nutrition intake computed from the consumption history, and the nutrition requirement of the user computed from the personal information, the PFD in some embodiments identifies the nutritional need of the user and recommends a recipe accordingly. In some embodiments, the selection of the recipe is further based on the user's preference in food (which is specified in the personal information 220 or deduced from the consumption history 260 in some embodiments). The PFD then presents the recommended recipe at its display 160. In some embodiments, the mobile device also allows the user to select the recommend recipe from the user interface 131.

Figure 6:
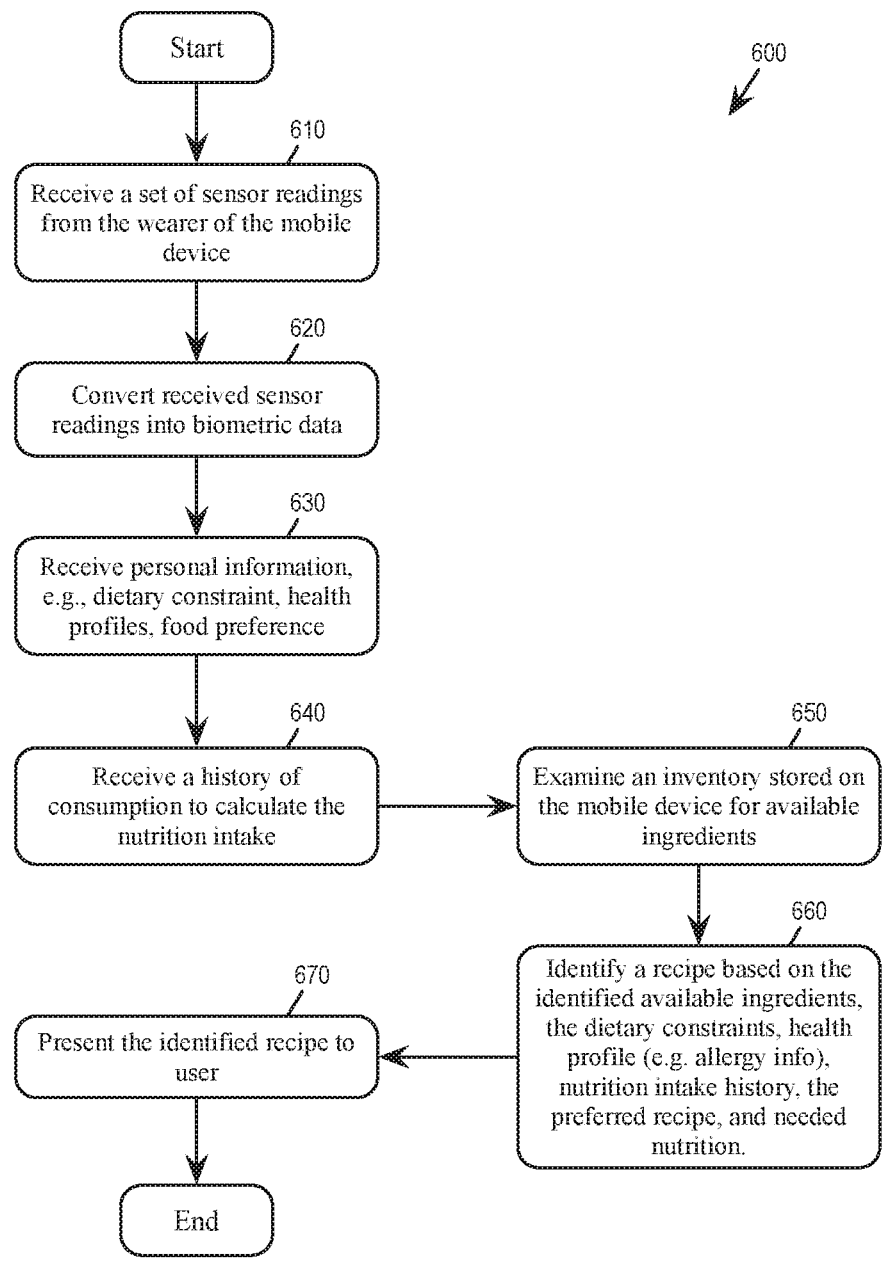
FIG. 6 conceptually illustrates a process for recommending a recipe based on sensor data provided by the mobile device running the PFD.

FIG. 6 conceptually illustrates a process 600 for recommending a recipe based on sensor data provided by the mobile device running the PFD. In some embodiments, a processing unit such as the processor 110 of the example computing device 100 performs the process 600 as part of its PFD management operations.

The process 600 starts by receiving (at 610) a set of sensor data measured from the wearer of the mobile device. These sensor readings are provided by the sensors of the mobile device such as motion sensors, temperature sensors, and pulse sensors, etc. For the example computing device 100, the sensors 140 provides the set of sensor data.

The process then converts (at 620) the received sensor readings into biometric data of the user, such as calories burned, body temperature, blood pressure, etc. These biometric data is used to determine the nutrition needed by the user.

The process then receives (at 630) personal information regarding the user that is stored in the database of the PFD, such as any medial conditions that the user may have that would require him or her to abstain from food with certain types of ingredients. Such personal information also includes the user's preference in food in some embodiments.

The process then receives (at 640) a consumption history, which documents the types of food consumed by the user (e.g., according to the recipes prepared), from which the PFD can determine the nutrition intake of the user over the recent period.

The process examines (at 650) the inventory stored on the mobile device for available ingredients and identifies (at 660) a recipe based on what is available according to the inventory, the personal information of the user, the nutrition need of the user based on the sensor input, and the past nutrition intake of the user stored in the PFD database. For the example computing device 100, the personal information, the consumption history, and the inventory are stored in the storage 120. The process presents (at 670) the identified recipe to the user, e.g., through the display 160 of the mobile device. The process 600 then ends.

Figure 7:
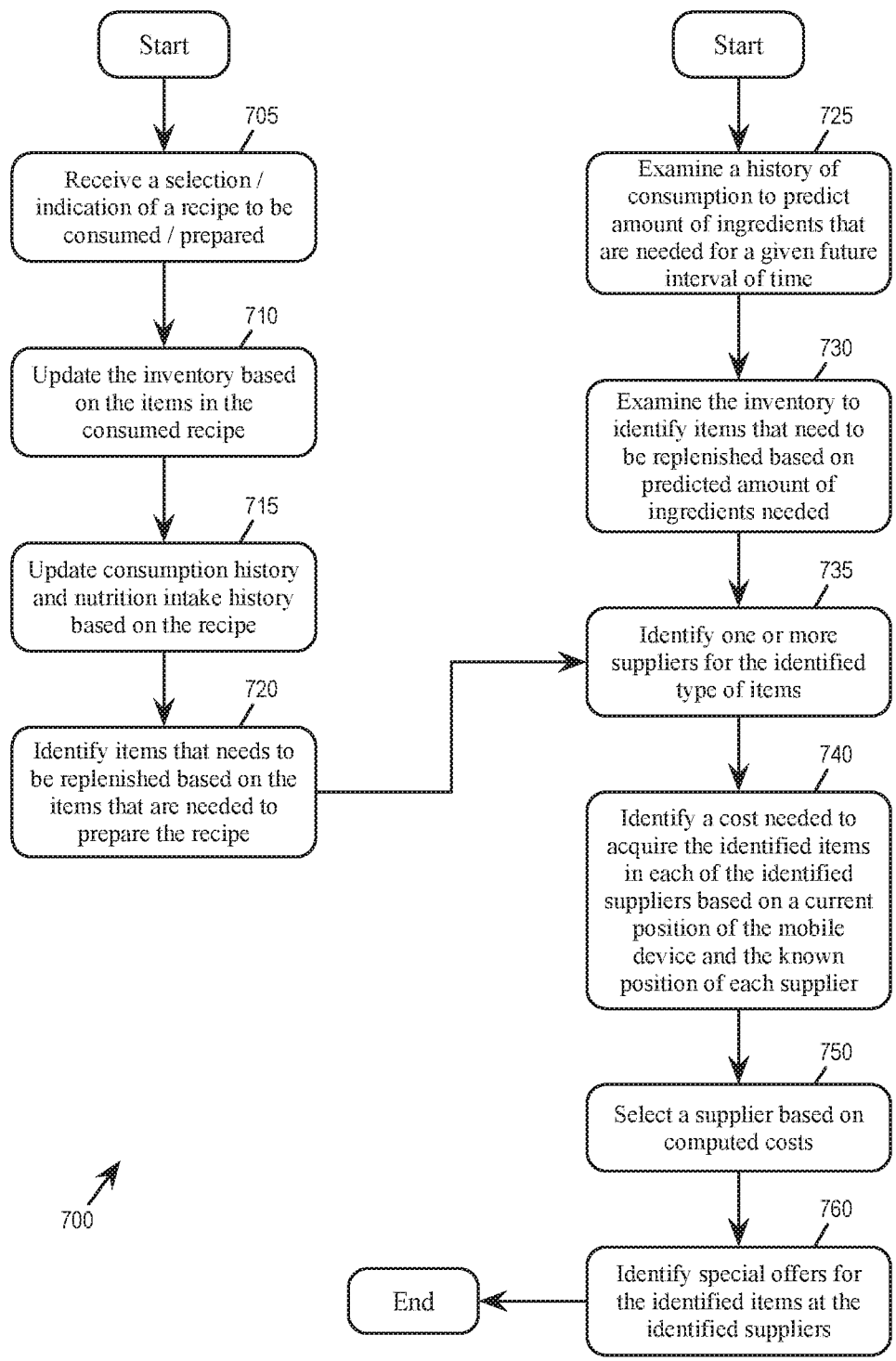
FIG. 7 conceptually illustrates a process for identifying items that are needed to replenish the inventory of the PFD as well as for recommending a supplier for the acquiring or purchasing the item.

FIG. 7 conceptually illustrates a process 700 for identifying items that are needed to replenish the inventory of the PFD as well as for recommending a supplier for the acquiring or purchasing the item. In some embodiments, a processing unit such as the processor 110 performs the process 700 as part of its PFD management operations. In some embodiments, the processor(s) of the mobile device operating PFD executes both the processes 600 and 700 at the same time.

In some embodiments, the process 700 starts when it receives (at 705) a selection of a recipe to be consumed or prepared. Some embodiments receive this selection from a user interface of the mobile device. The process then updates (at 710) the inventory based on the items in the consumed recipe, e.g., to reduce the count of the corresponding items in the PFD's inventory. The update of inventory is described by reference to FIG. 3 above.

The process then updates (at 715) the consumption history based on the recipe. In some embodiments, the PFD converts the consumption history into a nutrition intake history based on the nutrition information obtained from the manufacturer. The process examines (at 720) the inventory to identify items (or types of items) that needs to be replenished based on the items that are going to be consumed in preparation of the recipe. The process then proceeds to 735.

In some embodiments, the process 700 starts by examining (at 725) the consumption history to predict the amount of ingredients or food items that will be needed for a future period of time. The process examines (at 730) the inventory to identify items that need to be replenished based on the predicted amount of the ingredients or food items needed. The process then proceeds to 735.

At 735, the process identifies one or more suppliers that can provide the identified (types of) items. The identification of suppliers is described by reference to FIG. 4 above.

The process identifies (at 740) a cost associated with acquiring the identified items for each of the identified suppliers based on a current position of the mobile device and the known position of each supplier. In some embodiments, a cost for acquiring an item at a supplier is computed based on the price of the item at the supplier, the time required to reach the supplier, as well as other information about the supplier. In some embodiments, when computing the cost of the item, the process factors in any special offers or coupons that are available.

In some embodiments, the process computes a route from the mobile device to the supplier and receives traffic information regarding the route when computing the cost to acquire the item at the supplier. In some embodiments, a supplier can be a virtual store over the Internet so the cost of acquiring the item is based on the expected wait time for receiving the delivery of the item, the shipping cost, as well as the price of the item itself. Such cost is computed based on the position of the suppliers as well as the position of the mobile device (provided by the GPS of the device). The use of GPS data by PFD is further described by reference to FIG. 4 above.

The process selects (at 750) a supplier based on the computed costs for different suppliers. Based on the selection, the process also presents a recommendation to the user at the display of the mobile device. The process presents (at 760) special offers for any other items available at the store that may be of interest to the user (some embodiments identify other items of interest based on the content of the PFD database, such as the consumption history 260 and personal information 220). The process 700 then ends.

While the examples described above by reference to FIGS. 1-7 describe a "personal food database" that targets food preparation, some embodiments apply the same concepts to operating and maintaining a personalized database at a mobile device for other types of consumable goods. For example, instead of a personal "food" database, some embodiments implement a personal database for construction or home improvement projects. In such an example, the personal database has an inventory of construction materials, and each home improvement or repair projects entered into the personal database would reduce the count of (or remove) items in the inventory based on the materials specified in the project (like recipes in PFD). The mobile device running the personal home improvement database also maintains information about suppliers of construction materials and present recommendation for where to acquire the materials if the inventory needs replenishment. In some of these embodiments, the mobile device uses its global positioning capabilities to locate suppliers and to notify the user of available special offers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
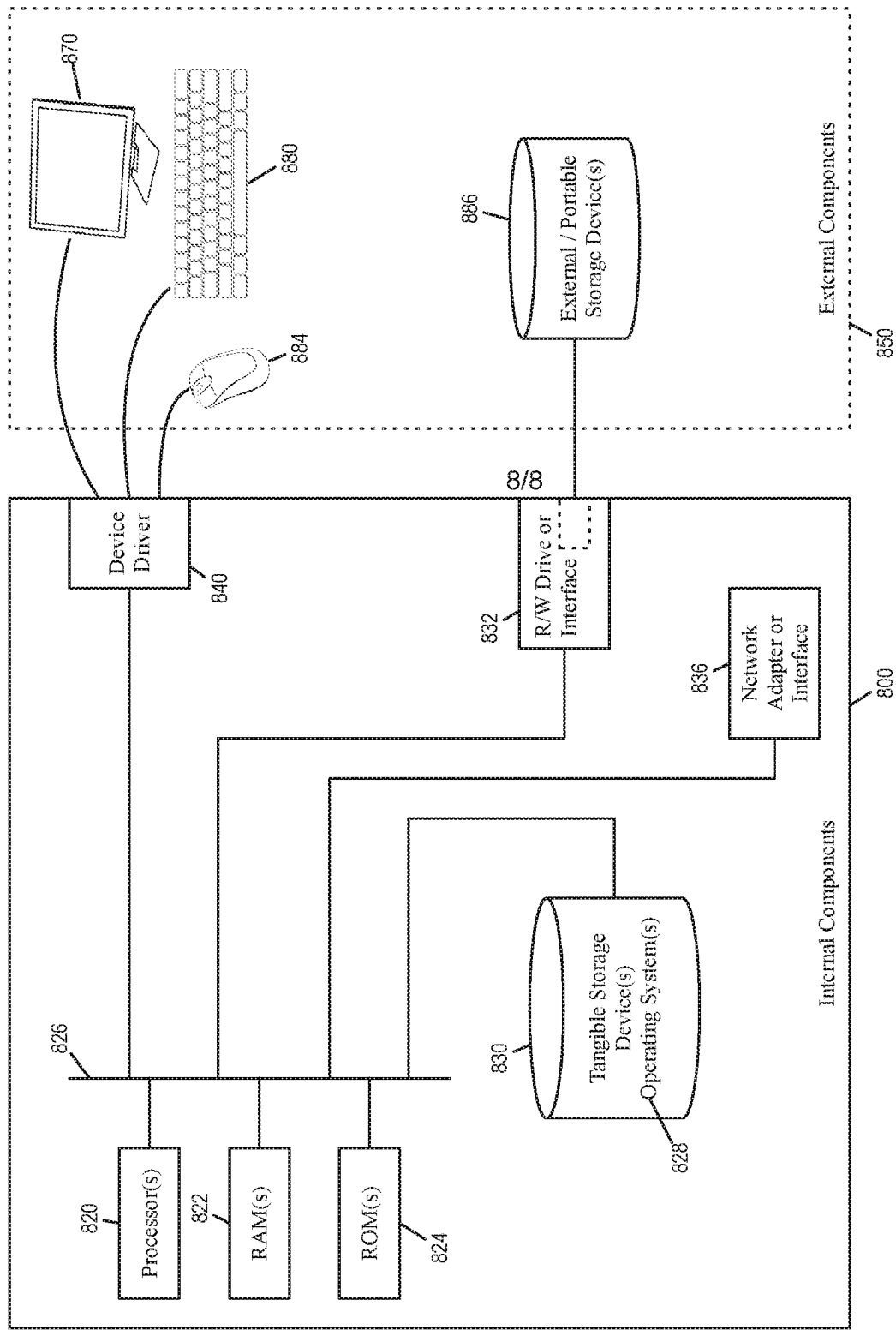
FIG. 8 shows a block diagram of the components of a data processing system in accordance with an illustrative embodiment of the present disclosure.

FIG. 8 shows a block diagram of the components of a data processing system 800 and 850 that may be included within a mobile device (e.g., 100) in accordance with an illustrative embodiment of the present disclosure. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 800, 850 is representative of any electronic device capable of executing machine-readable program instructions. Data processing system 800, 850 may be representative of a smart phone, a computer system, PDA, or other electronic devices. Examples of computing systems, environments, and/or configurations that may be represented by data processing system 800, 850 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing system 800, 850 may include may include a set of internal components 800 and a set of external components 850 illustrated in FIG. 8. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the programs for executing the processes 600 and 700 are stored on one or more computer-readable tangible storage devices 830 for execution by one or more processors 820 via one or more RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 886 such as a CD-ROM, DVD, memory stick, magnetic tape, magnetic disk, optical disk or semiconductor storage device. The instructions for executing the processes 600 or 700 can be stored on one or more of the respective portable computer-readable tangible storage devices 886, read via the respective R/W drive or interface 832 and loaded into the respective hard drive 830.

The set of internal components 800 may also include network adapters (or switch port cards) or interfaces 836 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 836. From the network adapters (or switch port adaptors) or interfaces 836, the instructions and data of the described programs or processes are loaded into the respective hard drive 830. The network may comprise copper wires, optical fibers, wireless transmission, routers, firewalls, switches, gateway computers and/or edge servers.

The set of external components 850 can include a computer display monitor 870, a keyboard 880, and a computer mouse 884. The set of external components 850 can also include touch screens, virtual keyboards, touch pads, pointing devices, and other human interface devices. The set of internal components 800 also includes device drivers 840 to interface to computer display monitor 870, keyboard 880 and computer mouse 884. The device drivers 840, R/W drive or interface 832 and network adapter or interface 836 comprise hardware and software (stored in storage device 830 and/or ROM 824).

The foregoing one or more embodiments facilitate the management of personalized inventory or database within a computer infrastructure by utilizing the sensor and/or navigation capabilities of a mobile device. Along with other information stored at the mobile device, the computing infrastructure analyzes the sensor and navigation data of the mobile device to make a personalized recommendation regarding a recipe to consume or a supplier to obtain items to replenish the inventory.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device comprising:
a processor;
a data input device;
a global positioning device;
a biometric monitor having one or more sensors operative to measure biometric data of a health of a user carrying the mobile device;
a display; and
a memory storing a software, wherein the execution of the software by the processor configures the processor to perform acts comprising:
automatically presenting, by the processor, on the display of the user device, one or more recipes based on the received data of the one or more sensors;
receiving a selection of a recipe of the one or more recipes, from the user;
updating an inventory in the memory of the mobile device based on data received through the data input device and the data of the biometric monitor, wherein updating the inventory comprises monitoring purchases on the mobile device and subtracting consumption from the inventory in the memory of the mobile device based on the selected recipe;
identifying a type of items based on the inventory;
identifying a supplier of the identified type of items based on a position of the mobile device provided by the global positioning device; and
presenting information regarding the identified supplier at the display.

2. The mobile device of claim 1, wherein the execution of the software further configures the processor to perform an act comprising planning a route to the supplier for the identified type of items based on the current position of the mobile device.

3. The mobile device of claim 1, further comprising a wireless communication device configured to receive information from a server regarding a type of one or more items in the inventory.

4. The mobile device of claim 1, wherein:
the data input device is configured to receive an identification of an item, and
the execution of the software further configures the processor to perform an act comprising adding the item to the inventory according to the received identification.

5. The mobile device of claim 4, wherein receiving the identification comprises optically analyzing an image encoding the identification.

6. The mobile device of claim 5, further comprising a wireless communication device configured to receive information from a server based on the received identification of the item.

7. The mobile device of claim 1, further comprising a storage, wherein:
the data input device is configured to receive a recipe,
the storage is configured to store a set of received recipes, each recipe enumerates a list of items to consume and an amount of each item in the list to consume.

8. The mobile device of claim 7, wherein:
the data input device is configured to receive a consumption specification,
the consumption specification comprises a selection of a recipe from the stored recipes,
the execution of the software further configures the processor to perform an act comprising: removing items in the inventory according to the recipe selected by the consumption specification.

9. The mobile device of claim 8, wherein the execution of the software further configures the processor to perform acts comprising:
storing a history of consumption in the memory; and
updating the history of consumptions based on the received consumption specification.

10. The mobile device of claim 9, wherein the execution of the software further configures the processor to perform an act comprising: generating a recommendation for consumption based on the stored consumption history.

11. The mobile device of claim 10, wherein identifying the type of items by the processor comprises: identifying a type of items whose count in the inventory is below a threshold, wherein the threshold is determined based on a prediction of an amount of the type of items for a period of time.

12. A mobile device comprising:
a processor;
a data input device;
a set of sensors;
a display;
a storage configured to store a plurality of recipes, a history of consumption, a set of biometric data from the set of sensors, and an inventory of foods; and
a memory storing a software, wherein the execution of the software by the processor configures the processor to perform acts comprising:
updating the set of biometric data based on a set of sensor data provided by the set of sensors;
automatically selecting, by the processor, a recipe from the plurality of recipes based on the history of consumption, the inventory of foods, and the set of biometric data;
presenting the selected recipe at the display; and
updating an inventory in the memory based on data received through the data input device and the updated set of biometric data, wherein updating the inventory comprises monitoring purchases on the mobile device and subtracting consumption from the inventory in the memory of the mobile device based on the selected recipe.

13. The mobile device of claim 12, wherein the set of sensors comprises motion sensor configured to sense the motion of the mobile device.

14. The mobile device of claim 12, wherein the set of sensors comprises a set of biometric sensors.

15. The mobile device of claim 12, wherein the set of biometric data comprises a count of calories burned by the wearer of the mobile device.

16. The mobile device of claim 12, wherein the history of consumption comprises a record of recipes consumed.

17. The mobile device of claim 12, wherein the execution of the software further configures the processor to perform acts comprising: selecting the recipe based on the inventory by selecting a recipe whose ingredients are available for consumption according to the inventory.

18. A computing device comprising:
a set of processing units for executing instructions; and
a computer readable storage medium storing sets of instructions for execution by the set of processing units, the sets of instructions for:

receiving data from a data input device of a mobile device;
identifying a current position of the mobile device;
determining biometric information of a user carrying by a biometric monitor of the mobile device;
storing an inventory of a plurality of types of items at the mobile device;
identifying a type of items based on the inventory;
identifying a supplier of the identified type of items based on the identified position of the mobile device;
displaying information regarding the identified supplier at the mobile device;
automatically selecting a recipe, by the computing device, based on the biometric information of the user; and
updating the inventory based on the received data and the biometric information, wherein updating the inventory comprises monitoring purchases on the mobile device and subtracting consumption from the inventory in the memory of the mobile device based on the selected recipe.

19. The method of claim 18 further comprising planning a route to the supplier for the identified type of items based on the current position of the mobile device.

20. The method of claim 19, wherein displaying information regarding the identified supplier comprises displaying the planed route.

* * * * *